Patented Sept. 11, 1951

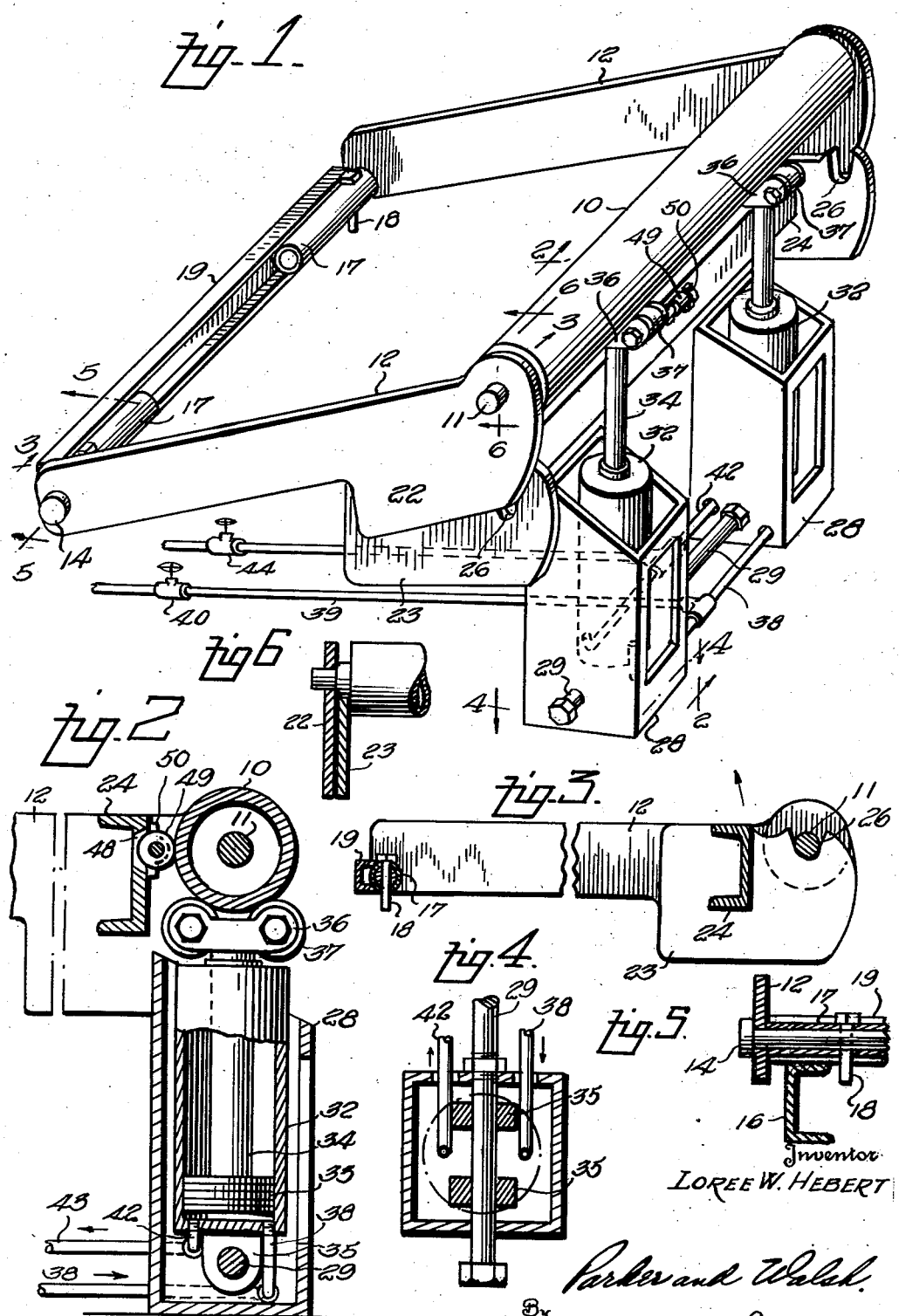

2,567,335

UNITED STATES PATENT OFFICE 2,567,335

LOAD HANDLING ROLLER-JACK FOR TRUCKS

Loree W. Hebert, Sulphur, La.

Application July 14, 1948, Serial No. 38,594

12 Claims. (Cl. 214—84)

This invention relates to a hydraulically operated device for assisting in the handling of loads on trucks.

In the handling of heavy loads on motor vehicles, it is sometimes the practice to load a relatively heavy article or group of articles on the bed of a truck and then back the truck with the load overhanging the rear end thereof into position for the coupling of a trailer to the truck to support the overhanging end of the load carried by the truck. This is done, for example, in the handling of heavy oil field machinery and equipment. Moreover, where it is desired to unload such heavy pieces of equipment, it frequently is necessary to uncouple the trailer, move the truck into position in front of a platform and then back the truck into position to unload it. Where such platform is even slightly higher than the bed of the truck, substantial difficulty is involved in the lifting of the overhanging ends of the equipment to permit the pieces to be moved onto the platform.

An important object of the present invention is to provide a novel apparatus adapted for attachment to the rear end of a truck whereby the loading of the truck is facilitated by the winching of the load onto the truck over a roller forming part of the present invention and to provide means for elevating the roller to lift any overhanging ends of the pieces loaded on the truck to facilitate the backing of the truck into position for the coupling on of a trailer, or to facilitate the unloading of the equipment to a platform or the like arranged at a higher elevation than the bed of the truck.

A further object is to provide an apparatus of this character wherein the elevation of the roller is accomplished by hydraulically-operated means so arranged as to apply upward forces to the roller thus substantially directly supporting the loads on the roller when the latter is raised by the hydraulic means.

A further object is to provide an apparatus of this character wherein the hydraulically-operated means transmits its forces to the load-supporting roller through anti-friction rollers which permit the load-supporting roller to be freely turned and to determine the altering of the positions of the hydraulic means in accordance with the swinging about its pivot axis of the frame which carries the load-supporting roller.

Other objects and advantages of the invention will become apparent during the course of the following description.

In the drawing, I have shown one embodiment of the invention. In this showing, Figure 1 is a perspective view of the apparatus, the load-supporting roller and associated elements being shown in elevated positions, Figure 2 is a vertical sectional view on line 2—2 of Figure 1, Figure 3 is a vertical longitudinal sectional view taken substantially on line 3—3 of Figure 1, Figure 4 is a fragmentary horizontal sectional view on line 4—4 of Figure 1, Figure 5 is a fragmentary detailed sectional view on line 5—5 of Figure 1, a portion of the frame being shown, and Figure 6 is a detailed section on line 6—6 of Figure 1.

Referring to Figure 1, numeral 10 designates a load-supporting roller adapted to extend transversely of a truck bed adjacent the rear end thereof, as will become apparent. The roller 10 carries projecting trunions 11 to journal the roller in side frames 12, the ends of the roller 10 being spaced from the frames 12 as shown in Figure 6 for a purpose to be described.

At their forward ends, the frames 12 are journaled on heavy pivot pins 14 which may be supported with respect to the truck chassis in any suitable manner, for example, as described below. The pins 14 project into the ends of tubular members 17 and are positively held in position therein by means of pins or bolts 18. The ends of the tubular members 17 act as spacers for the frames 12 and the heads of the pins 14 prevent spreading of the frames 12. The tubular members 17 are arranged partially in and welded to a transverse channel 19 preferably welded to a suitable portion of the truck frame 16 (see Figure 5).

At their rear ends, the frame members 12 are provided with depending portions 22 slidable over plates 23 carried by transverse channel 24 welded to a suitable part of the rear end of the truck frame to be supported thereby. The plates 23 are notched as at 26 to receive the trunions 11 to support the roller 10 when the latter is in its lower or normal position as shown in Figure 3.

A pair of open-topped housings 28 is arranged below the roller 10. These housings are preferably welded to the rear end of the truck frame (not shown) and a heavy transverse rod 29 extends through the housings. This rod serves as a bolt the ends of which, beyond the remote sides of the housings 28, may extend through any suitable support forming a part of or secured to the truck frame. The housings 28 contain and serve to protect hydraulic cylinders 32 each of which is provided with a piston 33 carrying a piston rod 34 projecting upwardly therefrom. The bottom of each cylinder 32 carries a heavy ear 35 pivotally supported by the rod 29. The housings 20, as shown in Figure 2, are sufficiently wider than the diameter of the cylinders 32 to permit the latter to swing on the axis of the rod 29 during the operation described below. The upper end of each piston rod 34 carries a yoke 36 rotatably supporting a pair of rollers 37 as clearly shown in Figure 2. Both rollers of each pair contact with the roller 10 when the latter is to be elevated through the admission of hydraulic fluid under pressure into the cylinders 32, as will become apparent.

A pipe 38 is connected between the cylinders 32 to supply hydraulic fluid thereto. This pipe is connected to a supply line 39 having a manually controlled valve 30 therein and leading to a pump or other suitable hydraulic pressure supply. The cylinders 32 also communicate with the ends of a pipe 42 to which is connected a return line 43 having a valve 44 therein and leading back to a hydraulic fluid reservoir or tank.

Means is provided to protect the roller 10 against horizontal forward buckling incident to the winching of loads into position in the manner described below. The channel 24 (Figure 2) is apertured as at 48 to receive a portion of a roller 49 journaled in bearings 50 carried beyond channel 24. When the roller 10 is in its normal position, it contacts with the roller 49 as shown in Figure 2.

*Operation*

The roller 10 normally occupies its lower position shown in Figures 2 and 3 in which case it will be supported by the plates 23. A load to be transported by the truck is winched up onto roller 10. With the winch line held taut, the hydraulic pump is started and with the valve 40 open, fluid under pressure will be supplied to the bottoms of the cylinders 32 to force the pistons 33 upwardly. Movement of these pistons is transmitted through piston rods 34, yokes 36 and rollers 37 to the load-supporting roller 10, thus raising the rear end of the load off the ground a sufficient distance to enable the truck to back up to and couple onto a trailer. The valve 44 is then opened to release hydraulic fluid from the cylinders 32, whereupon the roller 10 will move downwardly to its normal position and the overhanging load will be supported on the trailer.

When the equipment on the truck is to be unloaded, the procedure described above may be reversed to lift the overhanging end or ends of the equipment from the trailer whereupon the latter may be uncoupled and removed. If the load is to be deposited on the ground, fluid pressure may be released from the cylinders 32 and the winch line progressively unwound, whereupon the roller 10 will return to normal position and the rear end of the load will move downwardly to contact with the ground to be removed from the truck.

In some instances, it is necessary to deposit the truck load onto a platform, which may be higher than the bed of the truck. Under such conditions, the roller is hydraulically lifted, the trailer is uncoupled and released, and the truck is backed up to the platform with the load movable freely over and out of engagement with the platform until the truck is stopped in the proper position. Hydraulic fluid is then released from the cylinders 32 whereupon the overhanging ends of the load will move downwardly into engagement with the platform and the load may be pulled from the truck.

The apparatus obviously is capable of uses different from those described. For example, a load may be carried by the truck without the use of a trailer with the article or articles comprising the load projecting from the rear end of the truck. If such load is to be deposited on a platform higher than the truck bed, the truck may be backed into proximity to the platform, the roller 10 raised to elevate the rear end of the load, and the truck backed up to the platform to place the overhanging end of the load above the platform. The roller 10 then may be lowered in the manner previously described to deposit the load on the platform.

Attention is invited to the fact that when the roller 10 is elevated, the load thereon is efficiently supported by the rollers 37 and thus by the hydraulic fluid under pressure. The load is thus effectively distributed and heavy loads may be elevated without any tendency for the roller 10 to buckle. When the roller 10 is raised, it obviously follows an arcuate path of movement about the pivot axis of the pins 14. The construction shown is such that the cylinders 32 accommodate themselves to the slight horizontal component of movement of the roller 10. The cylinders 32 are pivoted on the rod 29 so as to be free to swing within reasonable limits on the axis of such rod. The roller 10 being supported on and between the axes of the rollers 37, the latter will follow movement of the roller 10 so that the axis of this roller will always lie in plane coincident with the axis of the piston rods 34.

While the load is being winched up over the roller 10, relatively heavy loads will transmit substantial horizontal forces against the roller 10 toward the forward end of the truck. The roller 49 contacts with the roller 10 when the latter is in normal position as shown in Figure 2 and accordingly the roller 49 acts as a thrust support for the roller 10 to prevent any tendency of the latter to buckle.

The present construction is relatively simple and has been found in practice to facilitate greatly the handling of long relatively heavy loads, for example, oil field machinery and equipment. Much time and labor is saved through the use of the device because of the facility with which loads may be winched into position and trailers coupled to the truck and the facility with which equipment may be unloaded in the manner described.

I claim:

1. For facilitating the handling of truck loadings, in combination, a truck bed, a roller supported adjacent the rear end of the truck bed, and hydraulically operated means for elevating said roller to lift a load resting thereon.

2. For facilitating the handling of truck loadings, in combination, a truck bed, a roller supported adjacent the rear end of the truck bed, hydraulic means for lifting said roller to elevate a load thereon, said means comprising a hydraulically operated device, and elevating means operable thereby and engageable with said roller intermediate the ends thereof.

3. Apparatus for facilitating the handling of truck loadings, comprising a roller adapted to be supported adjacent the rear end of the bed of the truck, a hydraulic cylinder arranged beneath said roller, a piston in said cylinder having a piston rod projecting thereabove, and a pair of rollers carried by the upper end of said piston rod and engageable with said first-named roller on opposite sides of a plane coincident with the axis of such roller and the axis of said cylinder, and means for supplying hydraulic fluid to the bottom of said cylinder.

4. Apparatus for facilitating the handling of truck loadings, comprising a pair of side frame members, means for pivotally mounting the forward ends of said members for swinging movement on a horizontal axis adjacent the rear end of a truck body, a load-supporting roller extending transversely between and rotatably supported by the rear ends of said frame members, and means for effecting an upward force directly against said roller to move it upwardly about said pivot axis to elevate a load resting on said roller.

5. Apparatus for facilitating the handling of truck loadings, comprising a pair of side frame members, means for pivotally mounting the forward ends of said members for swinging movement on a horizontal axis adjacent the rear end of a truck body, a load-supporting roller extending transversely between and rotatably supported by the rear ends of said frame members, and a hydraulic cylinder and piston mechanism for transmitting an upward force directly to the said roller intermediate the ends thereof to move it upwardly with said frame members about said pivot axis to elevate a load resting on said roller.

6. Apparatus for facilitating the handling of truck loadings, comprising a pair of side frame members, means for pivotally mounting the forward ends of said members for swinging movement on a horizontal axis adjacent the rear end of a truck body, a load-supporting roller extending transversely between and rotatably supported by the rear ends of said frame members, a hydraulic cylinder arranged beneath said roller, a piston in said cylinder having an upwardly extending piston rod, a pair of rollers carried by the upper end of said piston rod and engaging said load-supporting roller on opposite sides of a plane coincident with the axis of the said roller and the axis of said cylinder, said cylinder being supported at its lower end for turning movement on a horizontal axis, and means for supplying hydraulic fluid to the lower end of said cylinder.

7. Apparatus for facilitating the handling of truck loadings comprising a pair of side frame members adapted for connection at their forward ends to a truck body for swinging movement on a horizontal axis, a load-supporting roller extending transversely and horizontally between and rotatably supported by the rear ends of said frame members, means for supporting said roller in a normal lower position, a thrust roller supported for rotation on a fixed axis parallel to the axis of said load-supporting roller and contacting the latter forwardly thereof when said load-supporting roller is in its normal position to facilitate the winching of loads forwardly over said load-supporting roller, and means for transmitting an upward force directly to said load-supporting roller to elevate a load resting thereon.

8. Apparatus for facilitating the handling of truck loadings comprising a pair of side frame members adapted for connection at their forward ends to a truck body for swinging movement on a horizontal axis, a load-supporting roller extending transversely and horizontally between and rotatably supported by the rear ends of said frame members, means for supporting said roller in a normal lower position, a thrust roller supported for rotation on a fixed axis parallel to the axis of said load-supporting roller and contacting the latter forwardly thereof when said load-supporting roller is in its normal position to facilitate the winching of loads forwardly over said load-supporting roller, and hydraulically operated means for exerting an upward lifting force against said load-supporting roller intermediate the ends thereof to elevate a load resting on such roller.

9. Apparatus for facilitating the handling of troik loadings comprising a pair of side frame members adapted for connection at their forward ends to a truck body for swinging movement on a horizontal axis, a load-supporting roller extending transversely and horizontally between and rotatably supported by the rear ends of said frame members, means for supporting said roller in a normal lower position, a thrust roller supported for rotation on a fixed axis parallel to the axis of said load-supporting roller and contacting the latter forwardly thereof when said load-supporting roller is in its normal position to facilitate the winching of loads forwardly over said load-supporting roller, a hydraulic cylinder arranged beneath said load-supporting roller and supported at its lower end for turning movement on a horizontal axis parallel to the axis of said load-supporting roller, a piston in said cylinder having an upwardly projecting piston rod, a pair of rollers carried by the upper end of said piston rod and engaging said load-supporting roller on opposite sides of a plane coincident with the axis of said load-supporting roller and the axis of said cylinder, and means for supplying hydraulic fluid to the lower end of said cylinder.

10. Apparatus for facilitating the handling of truck loadings comprising a pair of side frame members adapted for connection at their forward ends to a truck body for swinging movement on a horizontal axis, a load-supporting roller extending transversely and horizontally between and rotatably supported by the rear ends of said frame members, a pair of stationary side plates arranged adjacent and parallel to said frame members to limit downward movement of said load-supporting roller to a lower normal position, a transverse rail connected between said side plates, a thrust roller rotatably supported by said rail for rotation on a fixed axis parallel to the axis of said load-supporting roller, said thrust roller being engageable with said load-supporting roller forwardly thereof when the latter is in its normal position, and means for transmitting an upward force directly to said load-supporting roller intermediate the ends thereof for elevating a load on such roller.

11. Apparatus for facilitating the handling of truck loadings comprising a pair of side frame members adapted for connection at their forward ends to a truck body for swinging movement on a horizontal axis, a load-supporting roller extending transversely and horizontally between and rotatably supported by the rear ends of said frame members, a pair of stationary side plates arranged adjacent and parallel to said frame members to limit downward movement of said load-supporting roller to a lower normal position, a transverse rail connected between said side plates, a thrust roller rotatably supported by said rail for rotation on a fixed axis parallel to the axis of said load-supporting roller, said thrust roller being engageable with said load-supporting roller forwardly thereof when the latter is in its normal position, and a pair of spaced hydraulic devices arranged beneath and between the ends of said load-supporting roller and having pressure movable elements engageable against the bottom of said load-supporting roller for moving the latter upwardly to elevate a load thereon.

12. Apparatus for facilitating the handling of truck loadings comprising a pair of side frame members adapted for connection at their forward ends to a truck body for swinging movement on a horizontal axis, a load-supporting roller extending transversely and horizontally between and rotatably supported by the rear ends of said frame members, a pair of stationary side plates arranged adjacent and parallel to said frame members to limit downward movement of said load-supporting roller to a lower normal position, a transverse rail connected between said side plates, a thrust roller rotatably supported by said rail for rotation on a fixed axis parallel to the axis of said load-supporting roller, said thrust roller being engageable with said load-supporting roller forwardly thereof when the latter is in its normal position, a pair of hydraulic cylinders beneath said load-supporting roller and supported at their lower ends for turning movement on a common horizontal axis parallel to the axis of said load-supporting roller, a piston in each cylinder having an upwardly extending piston rod, a pair of rollers carried by each piston rod and engageable with the bottom of said load-supporting roller at points spaced from the adjacent end thereof and arranged on opposite sides of a plane coincident with the axis of said load-supporting roller and said cylinders, and means for simultaneously supplying hydraulic fluid to the lower ends of said cylinders.

LOREE W. HEBERT.

REFERENCES CITED

The following references are of record in the file of this patent:

UNITED STATES PATENTS

| Number | Name | Date |
|---|---|---|
| 141,098 | Abeel | July 22, 1873 |
| 609,120 | Peterson | Aug. 16, 1898 |
| 1,439,257 | Ogren | Dec. 19, 1922 |
| 2,079,790 | Colorigh | May 11, 1937 |
| 2,148,224 | Willis | Feb. 21, 1939 |
| 2,470,360 | Messick | May 17, 1949 |
| 2,504,467 | Thetford | Apr. 18, 1950 |